(12) United States Patent
Lee

(10) Patent No.: US 10,642,375 B2
(45) Date of Patent: May 5, 2020

(54) METHOD, MEDIA AND DEVICE FOR TRANSMITTING COMPUTER PROGRAM EXECUTION AND KEYSTROKE INFORMATION

(71) Applicant: RAZER (ASIA-PACIFIC) PTE. LTD., Singapore (SG)

(72) Inventor: Michael Anthony Lee, Palo Alto, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 178 days.

(21) Appl. No.: 15/752,847

(22) PCT Filed: Aug. 21, 2015

(86) PCT No.: PCT/SG2015/050271
§ 371 (c)(1),
(2) Date: Feb. 14, 2018

(87) PCT Pub. No.: WO2017/034471
PCT Pub. Date: Mar. 2, 2017

(65) Prior Publication Data
US 2018/0260036 A1    Sep. 13, 2018

(51) Int. Cl.
*G06F 3/023* (2006.01)
*G06F 3/02* (2006.01)
(Continued)

(52) U.S. Cl.
CPC .......... *G06F 3/0237* (2013.01); *G06F 3/0202* (2013.01); *G06F 3/0219* (2013.01);
(Continued)

(58) Field of Classification Search
CPC .... G06F 3/0237; G06F 3/0202; G06F 3/0219; G06F 9/453; G09B 19/00; G09B 19/22; G09B 23/30
See application file for complete search history.

(56) References Cited

U.S. PATENT DOCUMENTS 5,699,059 A    12/1997  Hiller
7,802,103 B2   9/2010   Bender et al.
(Continued)

FOREIGN PATENT DOCUMENTS

EP    0662231 B1    3/1997
WO    WO 2008-109680    9/2008

OTHER PUBLICATIONS

CnCNet, Command & Conquer: Red Alert 1 Online—Tutorial Basic Hotkeys, Jan. 8, 2015, YouTube, https://www.youtube.com/watch?v=yNxJhL8kM3w (Year: 2015).*
(Continued)

*Primary Examiner* — Ryan A Lubit
(74) *Attorney, Agent, or Firm* — Polsinelli PC

(57) ABSTRACT

According to various embodiments, an information distribution method may be provided. The information distribution method may include: receiving computer program execution information related to an execution of a computer program from a first computing device; receiving keystroke information related to input to the computer program from the first computing device; and transmitting the computer program execution information and the keystroke information to at least one further computing device.

19 Claims, 2 Drawing Sheets

(51) Int. Cl.
*G06F 9/451* (2018.01)
*G09B 19/00* (2006.01)
*G09B 19/22* (2006.01)
*G09B 23/30* (2006.01)
*H01H 13/83* (2006.01)

(52) U.S. Cl.
CPC ............. *G06F 9/453* (2018.02); *G09B 19/00* (2013.01); *G09B 19/22* (2013.01); *G09B 23/30* (2013.01); *H01H 13/83* (2013.01)

(56) References Cited

U.S. PATENT DOCUMENTS

| | | | |
|---|---|---|---|
| 8,001,237 | B2 | 8/2011 | Young Yee |
| 8,397,004 | B2 | 3/2013 | Schweig |
| 8,714,850 | B2 | 5/2014 | Ho et al. |
| 8,756,353 | B2 | 6/2014 | Thorne |
| 8,835,739 | B2 | 9/2014 | Bencar et al. |
| 2004/0137985 | A1 | 7/2004 | Sprudzans et al. |
| 2004/0261026 | A1 | 12/2004 | Corson |
| 2006/0069543 | A1 | 3/2006 | Sajwani et al. |
| 2006/0158353 | A1* | 7/2006 | Tseng ................... G06F 3/0202 341/22 |
| 2007/0294260 | A1* | 12/2007 | Lam ...................... G06F 9/453 |
| 2008/0220854 | A1* | 9/2008 | Midgley ................ A63F 13/12 463/25 |
| 2009/0150814 | A1 | 6/2009 | Eyer et al. |
| 2009/0173610 | A1* | 7/2009 | Bronstein ............. H05B 47/10 200/314 |
| 2009/0189858 | A1 | 7/2009 | Lev et al. |
| 2010/0283405 | A1* | 11/2010 | Ng ........................ G06F 3/0202 315/294 |
| 2010/0306683 | A1* | 12/2010 | Pance ................... G06F 3/0219 715/764 |
| 2010/0313736 | A1* | 12/2010 | Lenz ..................... G09B 15/02 84/477 R |
| 2013/0244215 | A1* | 9/2013 | Ho ........................ G06F 3/021 434/322 |
| 2015/0317910 | A1* | 11/2015 | Daniels ................. G16H 20/30 84/485 R |
| 2016/0100465 | A1* | 4/2016 | Prescott ................ A63F 13/22 345/170 |

OTHER PUBLICATIONS

Extended European Search Report dated Jun. 19, 2018, 7 pages, for the corresponding European Patent Application No. 15902380.3.
International Search Report and Written Opinion, dated May 20, 2016, for the corresponding International Application No. PCT/SG2015/050271 in 8 pages.

* cited by examiner

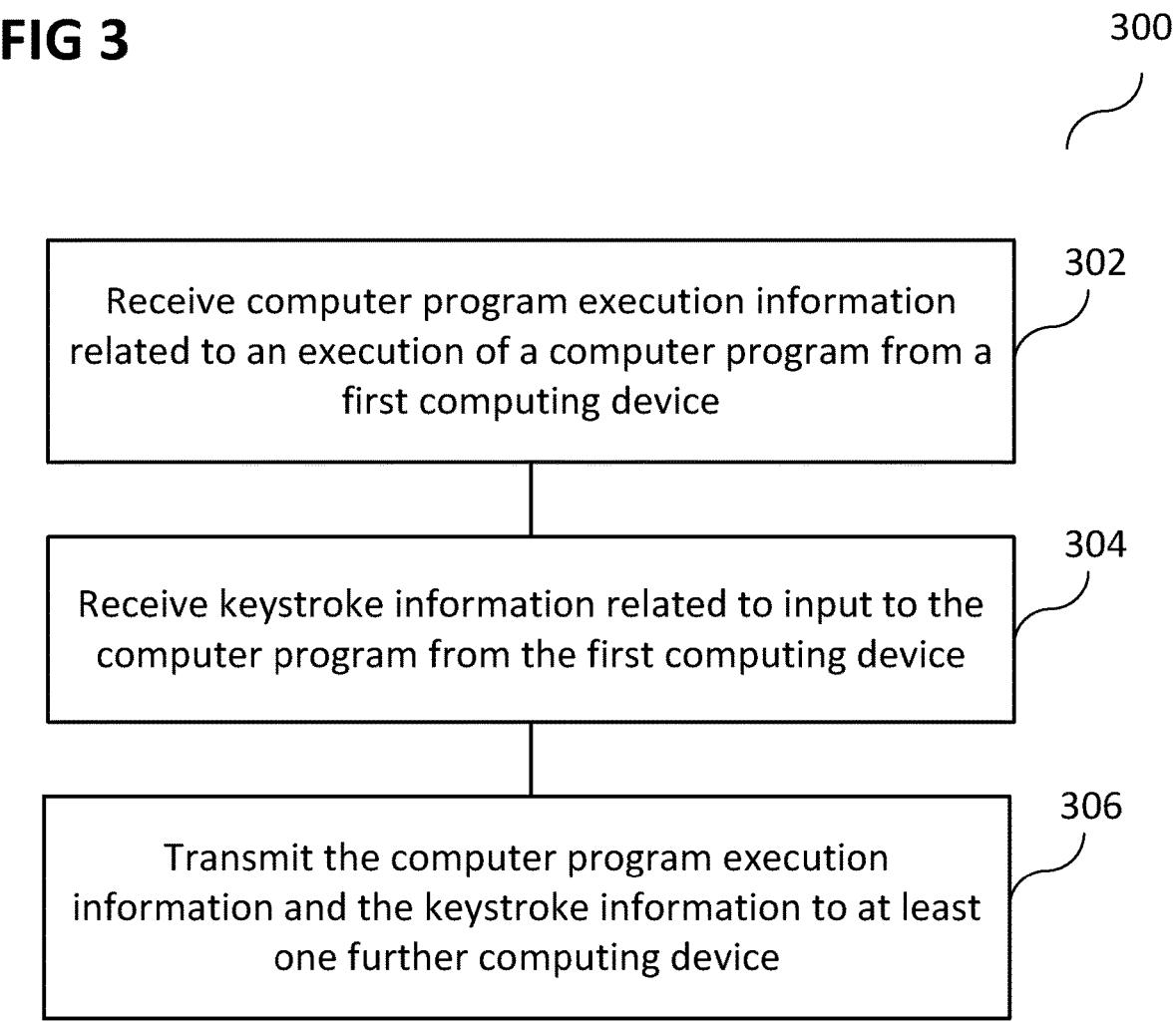
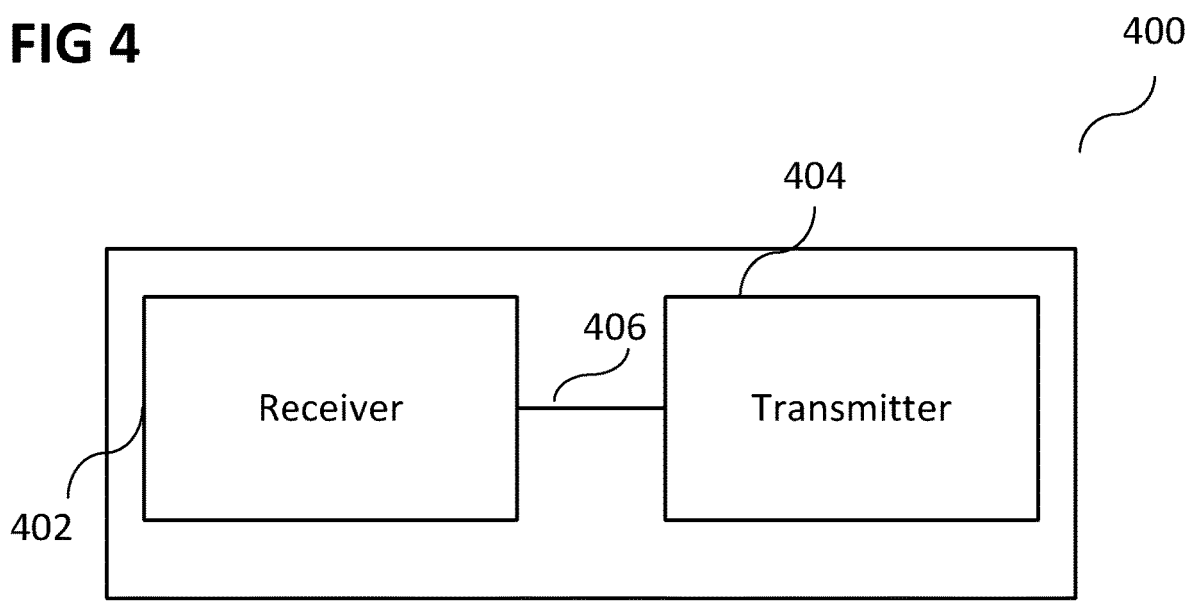

METHOD, MEDIA AND DEVICE FOR TRANSMITTING COMPUTER PROGRAM EXECUTION AND KEYSTROKE INFORMATION

TECHNICAL FIELD

Various embodiments generally relate to information distribution methods, computer readable media, and information distribution servers.

BACKGROUND

Gamers learn from other better gamers in order to improve their game. One way of learning is by observing keystroke patterns of their favorite gamers in order to improve their own game.

SUMMARY OF THE INVENTION

According to various embodiments, an information distribution method may be provided. The information distribution method may include: receiving computer program execution information related to an execution of a computer program from a first computing device; receiving keystroke information related to input to the computer program from the first computing device; and transmitting the computer program execution information and the keystroke information to at least one further computing device.

According to various embodiments, a computer readable medium may be provided including instructions which, when executed by a processor, cause the processor to perform an information distribution method. The information distribution method may include: receiving computer program execution information related to an execution of a computer program from a first computing device; receiving keystroke information related to input to the computer program from the first computing device; and transmitting the computer program execution information and the keystroke information to at least one further computing device.

According to various embodiments, an information distribution server may be provided. The information distribution server may include: a receiver configured to receive computer program execution information related to an execution of a computer program from a first computing device, and configured to receive keystroke information related to input to the computer program from the first computing device; and a transmitter configured to transmit the computer program execution information and the keystroke information to at least one further computing device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 3 shows a flow diagram illustrating an information distribution method according to various embodiments; and FIG. 4 shows an information distribution server according to various embodiments.

DETAILED DESCRIPTION

Figure 1:
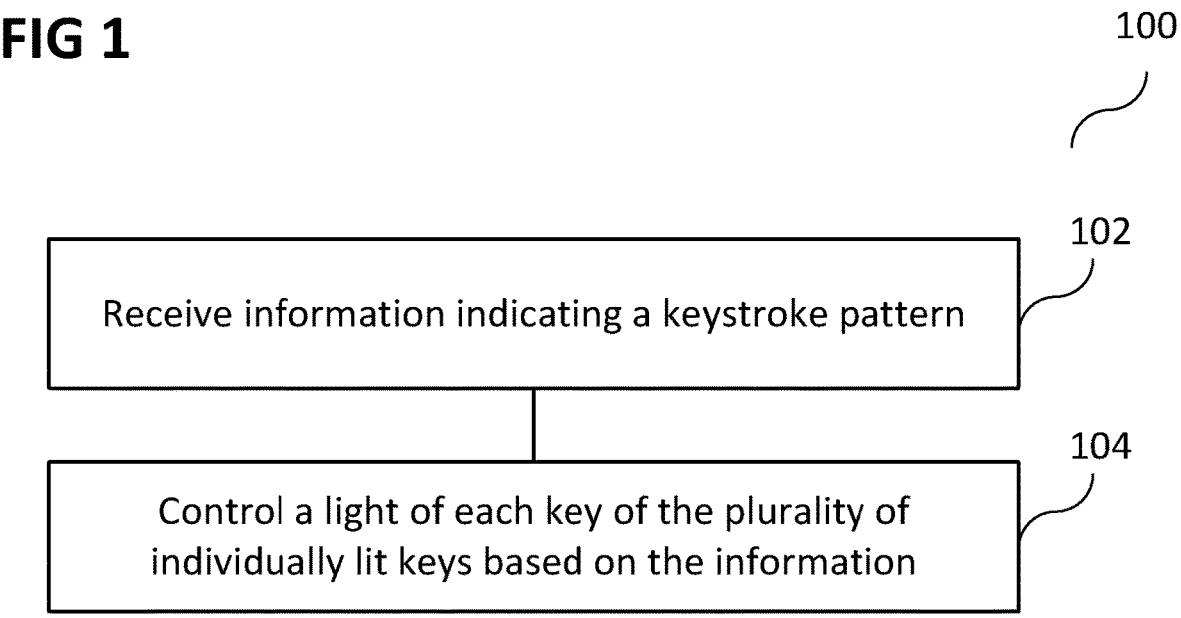
FIG. 1 shows a flow diagram illustrating a method for controlling a keyboard according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the keyboard as described in this description may include a memory which is for example used in the processing carried out in the keyboard. In this context, the information distribution server as described in this description may include a memory which is for example used in the processing carried out in the information distribution server. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

Gamers learn from other better gamers in order to improve their game. One way of learning is by observing keystroke patterns of their favorite gamers in order to improve their own game by getting visual feedback to either modify their technique or identifying patterns that can be collapsed into macro keys or short cut keys.

According to various embodiments, keystroke light patterns for streaming may be provided. According to various embodiments, devices and methods may be provided for keystroke patterns capture and live streaming for spectator viewing.

FIG. 1 shows a flow diagram illustrating a method for controlling a keyboard with a plurality of individually lit keys according to various embodiments. In 102, information indicating a keystroke pattern may be received. In 104, a light (for example light source) of each key of the plurality of individually lit keys may be controlled (for example individually controlled) based on the information.

In other words, according to various embodiments, a keystroke pattern input to a first keyboard may be indicated on a second keyboard by illuminating the keys of the second keyboard corresponding to the keystroke pattern.

According to various embodiments, the plurality of individually lit keys may include a plurality of individually backlit keys.

According to various embodiments, the keyboard may be connected to a computing device.

According to various embodiments, the information may be received from a streaming server.

According to various embodiments, the streaming server may provide a live stream of the information.

According to various embodiments, the information may be determined based on a user of a further keyboard actuating the keys of the further keyboard.

According to various embodiments, the information may be received from a storage.

According to various embodiments, the information may be received from a playback application.

According to various embodiments, the method may further include storing the information.

According to various embodiments, the method may further include storing the information in the keyboard.

According to various embodiments, the method may further include storing the information on a computing device connected to the keyboard.

According to various embodiments, the light of each key may be controlled in real-time compared to a capturing of the keystroke pattern.

According to various embodiments, the light of each key may be controlled in slow motion compared to a capturing of the keystroke pattern.

According to various embodiments, the method may further include replaying a control of each key.

According to various embodiments, the method may further include fast-forwarding a control of each key.

Figure 2:
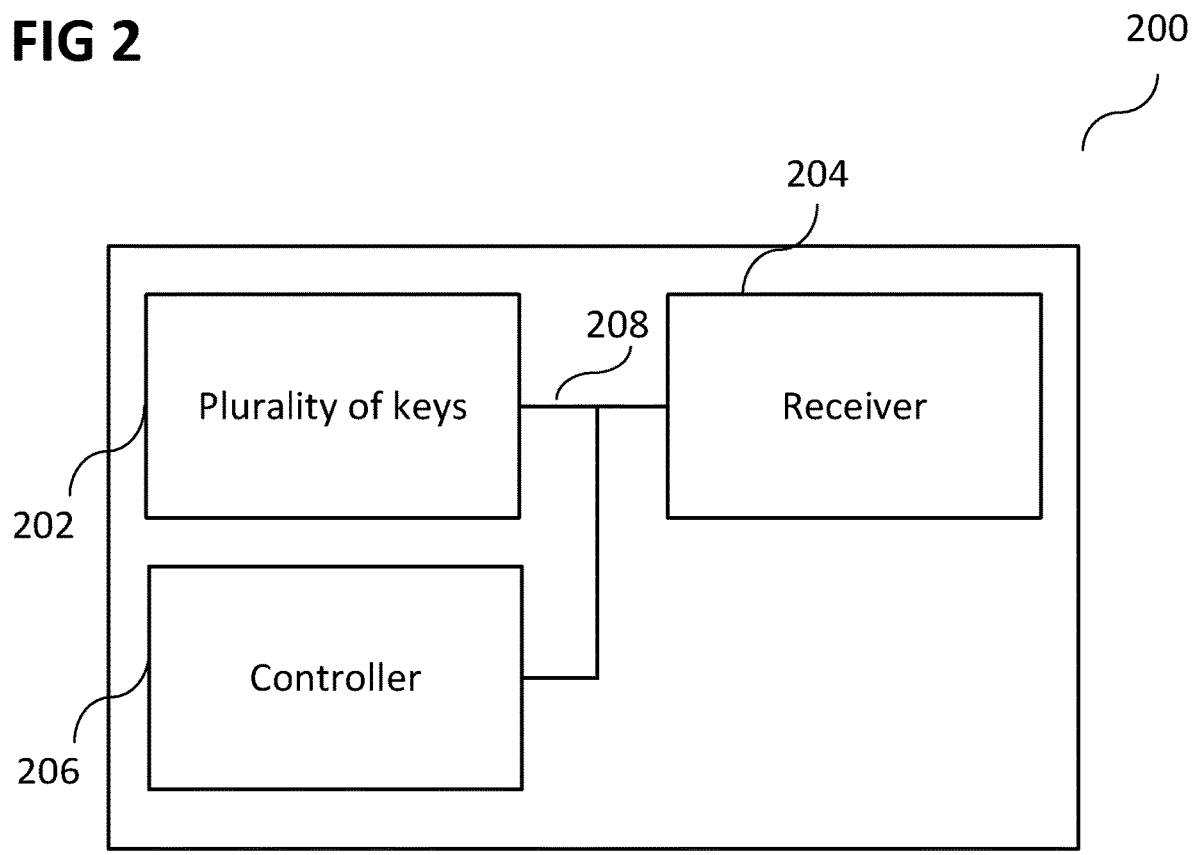
FIG. 2 shows a keyboard according to various embodiments.

FIG. 2 shows a keyboard 200 according to various embodiments. The keyboard 200 may include a plurality of keys 202, each key including a light source. The keyboard 200 may further include a receiver 204 configured to receive information indicating a keystroke pattern. The keyboard 200 may further include a controller 206 configured to individually control the light source of each key of the plurality of keys 202 based on the information. The plurality of keys 202, the receiver 204, and the controller 206 may be coupled with each other, like indicated by lines 208, for example electrically coupled, for example using a line or a cable, and/or mechanically coupled.

According to various embodiments, for each key the light source may include or may be or may be included in a backlight.

According to various embodiments, the keyboard 200 may be configured to be connected to a computing device.

According to various embodiments, the receiver 204 may be configured to receive the information from a streaming server.

According to various embodiments, the streaming server may provide a live stream of the information.

According to various embodiments, the information may be determined based on a user of a further keyboard actuating the keys of the further keyboard.

According to various embodiments, the receiver 204 may be configured to receive the information from a storage (in other words: memory; for example a storage in the keyboard 200 or a storage in a computing device connected to the keyboard 200).

According to various embodiments, the receiver 204 may be configured to receive the information from a playback application.

According to various embodiments, the keyboard 204 may be configured to store the information.

According to various embodiments, the keyboard 200 may be configured to store the information in the keyboard 200 (for example in a storage or memory provided in the keyboard 200).

According to various embodiments, the keyboard 200 may be configured to store the information on a computing device connected to the keyboard 200.

According to various embodiments, the controller 206 may be configured to control the light source of each key in real-time compared to a capturing of the keystroke pattern.

According to various embodiments, the controller 206 may be configured to control the light source of each key in slow motion compared to a capturing of the keystroke pattern.

According to various embodiments, the controller 206 may be configured to replay a control of each key.

According to various embodiments, the controller 206 may be configured to fast-forward a control of each key.

According to various embodiments may enable the keystrokes of a gamer to be captured, downloaded, and studied for enhancing gaming techniques of spectators.

FIG. 3 shows a flow diagram 300 illustrating an information distribution method according to various embodiments. In 302, computer program execution information related to an execution of a computer program may be received from a first computing device. In 304, keystroke information related to input to the computer program may be received from the first computing device. In 306, the computer program execution information and the keystroke information may be transmitted to at least one further computing device.

In other words, according to various embodiments, information related to execution of a computer program and information on input to the computer program may be received from a first computer and may be forwarded to another computer.

According to various embodiments, the keystroke information may include or may be information related to a keystroke pattern.

According to various embodiments, the computer program execution information may include or may be video information (in other words: screenshot videos) of a computer game.

According to various embodiments, the keystroke information may include or may be an input to the computer game provided by a player on the first computing device.

According to various embodiments, the transmitting may include or may be providing a live stream of the computer program execution information and the keystroke information.

According to various embodiments, the transmitting may include or may be providing a stored stream of the computer program execution information and the keystroke information.

According to various embodiments, the transmitting may include or may be transmitting to a keyboard of the at least one further computing device.

According to various embodiments, the transmitting may include or may be transmitting for indicating the input using backlights of a keyboard of the at least one further computing device.

According to various embodiments, the keystroke information may be based on video of a keyboard of the first computer.

According to various embodiments, the keystroke information may be based on mechanical switches of a keyboard of the first computer.

According to various embodiments, a computer readable medium may include instructions which, when executed by a processor, cause the processor to perform an information distribution method. The information distribution method may include: receiving computer program execution information related to an execution of a computer program from a first computing device; receiving keystroke information related to input to the computer program from the first computing device; and transmitting the computer program execution information and the keystroke information to at least one further computing device.

According to various embodiments, the keystroke information may include or may be information related to a keystroke pattern.

According to various embodiments, the computer program execution information may include or may be video information of a computer game.

According to various embodiments, the keystroke information may include or may be an input to the computer game provided by a player on the first computing device.

According to various embodiments, the transmitting may include or may be providing a live stream of the computer program execution information and the keystroke information.

According to various embodiments, the transmitting may include or may be providing a stored stream of the computer program execution information and the keystroke information.

According to various embodiments, the transmitting may include or may be transmitting to a keyboard of the at least one further computing device.

According to various embodiments, the transmitting may include or may be transmitting for indicating the input using backlights of a keyboard of the at least one further computing device.

According to various embodiments, the keystroke information may be based on video of a keyboard of the first computer.

According to various embodiments, the keystroke information may be based on mechanical switches of a keyboard of the first computer.

FIG. 4 shows an information distribution server 400 according to various embodiments. The information distribution server 400 may include a receiver 402 configured to receive computer program execution information related to an execution of a computer program from a first computing device, and configured to receive keystroke information related to input to the computer program from the first computing device. The information distribution server 400 may further include a transmitter 404 configured to transmit the computer program execution information and the keystroke information to at least one further computing device. The receiver 402 and the transmitter 404 may be coupled with each other, like indicated by line 406, for example electrically coupled, for example using a line or a cable, and/or mechanically coupled.

According to various embodiments, the keystroke information may include or may be information related to a keystroke pattern.

According to various embodiments, the computer program execution information may include or may be video information of a computer game.

According to various embodiments, the keystroke information may include or may be an input to the computer game provided by a player on the first computing device.

According to various embodiments, the transmitter 404 may be configured to provide a live stream of the computer program execution information and the keystroke information.

According to various embodiments, the transmitter 404 may be configured to provide a stored stream of the computer program execution information and the keystroke information.

According to various embodiments, the transmitter 404 may be configured to transmit to a keyboard of the at least one further computing device.

According to various embodiments, the transmitter 404 may be configured to transmit for indicating the input using backlights of a keyboard of the at least one further computing device.

According to various embodiments, the keystroke information may be based on video of a keyboard of the first computer.

According to various embodiments, the keystroke information may be based on mechanical switches of a keyboard of the first computer.

By being able to observe keystroke patterns, spectators may also be introduced to another aspect of visual entertainment, i.e. they may be able to observe live streaming of remote keystroke patterns of gamers on their own keyboards.

The keyboard information, i.e. keystroke patterns of a user (for example a gamer), may be streamed from the site that also streams the video/audio (for example of the game). Such live streaming of video/audio may be provided by live streaming platforms such as Twitch. The keyboard doesn't do any recording at all (i.e. it does not record the keystrokes). Rather, it plays back a lighting stream coming from a playback app or streaming client. For any type of stored playback, the recorder may have to store the keystrokes as well.

The spectator may use a keyboard with backlighting, such as the Chroma keyboard (which has individually backlit LED).

The keystroke patterns may be observed because the lights on conventional configurable backlit keyboards such as the Chroma may light up at the time a key is pressed. This feature may be for the spectators who are watching someone else playing a game. A spectator may start up a streaming client (i.e., Twitch) and then sit back and enjoy the video and audio capture, and may watch his keys light up because there is also a keystroke capture stream.

According to various embodiments, gamers may learn from better gamers by providing visual feedback of keystroke patterns and visual entertainment of spectating effect may be provided.

According to various embodiments, software that works with input devices with individually backlit keys such as keyboards or keypads may be provided.

According to various embodiments, a keyboard may not actually record the keystroke pattern, but rather, it may play back a lighting stream representative of the keystroke pattern coming from a playback app (application) or streaming client.

According to various embodiments, a computer readable medium may be provided which may include instructions which, when executed by a processor, make the process perform at least one of the methods described above.

The following examples pertain to further embodiments.

Example 1 is an information distribution method comprising: receiving computer program execution information related to an execution of a computer program from a first computing device; receiving keystroke information related to input to the computer program from the first computing device; and transmitting the computer program execution information and the keystroke information to at least one further computing device.

In example 2, the subject-matter of example 1 can optionally include that the keystroke information comprises information related to a keystroke pattern.

In example 3, the subject-matter of any one of examples 1 to 2 can optionally include that the computer program execution information comprises video information of a computer game.

In example 4, the subject-matter of example 3 can optionally include that the keystroke information comprises an input to the computer game provided by a player on the first computing device.

In example 5, the subject-matter of any one of examples 1 to 4 can optionally include that the transmitting comprises providing a live stream of the computer program execution information and the keystroke information.

In example 6, the subject-matter of any one of examples 1 to 5 can optionally include that the transmitting comprises providing a stored stream of the computer program execution information and the keystroke information.

In example 7, the subject-matter of any one of examples 1 to 6 can optionally include that the transmitting comprises transmitting to a keyboard of the at least one further computing device.

In example 8, the subject-matter of any one of examples 1 to 7 can optionally include that the transmitting comprises transmitting for indicating the input using backlights of a keyboard of the at least one further computing device.

In example 9, the subject-matter of any one of examples 1 to 8 can optionally include that the keystroke information is based on video of a keyboard of the first computer.

In example 10, the subject-matter of any one of examples 1 to 9 can optionally include that the keystroke information is based on mechanical switches of a keyboard of the first computer.

Example 11 is a computer readable medium comprising instructions which, when executed by a processor, cause the processor to perform an information distribution method, the information distribution method comprising: receiving computer program execution information related to an execution of a computer program from a first computing device; receiving keystroke information related to input to the computer program from the first computing device; and transmitting the computer program execution information and the keystroke information to at least one further computing device.

In example 12, the subject-matter of example 11 can optionally include that the keystroke information comprises information related to a keystroke pattern.

In example 13, the subject-matter of any one of examples 11 to 12 can optionally include that the computer program execution information comprises video information of a computer game.

In example 14, the subject-matter of example 13 can optionally include that the keystroke information comprises an input to the computer game provided by a player on the first computing device.

In example 15, the subject-matter of any one of examples 11 to 14 can optionally include that the transmitting comprises providing a live stream of the computer program execution information and the keystroke information.

In example 16, the subject-matter of any one of examples 11 to 15 can optionally include that the transmitting comprises providing a stored stream of the computer program execution information and the keystroke information.

In example 17, the subject-matter of any one of examples 11 to 16 can optionally include that the transmitting comprises transmitting to a keyboard of the at least one further computing device.

In example 18, the subject-matter of any one of examples 11 to 17 can optionally include that the transmitting comprises transmitting for indicating the input using backlights of a keyboard of the at least one further computing device.

In example 19, the subject-matter of any one of examples 11 to 18 can optionally include that the keystroke information is based on video of a keyboard of the first computer.

In example 20, the subject-matter of any one of examples 11 to 19 can optionally include that the keystroke information is based on mechanical switches of a keyboard of the first computer.

Example 21 is an information distribution server comprising: a receiver configured to receive computer program execution information related to an execution of a computer program from a first computing device, and configured to receive keystroke information related to input to the computer program from the first computing device; and a transmitter configured to transmit the computer program execution information and the keystroke information to at least one further computing device.

In example 22, the subject-matter of example 21 can optionally include that the keystroke information comprises information related to a keystroke pattern.

In example 23, the subject-matter of any one of examples 21 to 22 can optionally include that the computer program execution information comprises video information of a computer game.

In example 24, the subject-matter of example 23 can optionally include that the keystroke information comprises an input to the computer game provided by a player on the first computing device.

In example 25, the subject-matter of any one of examples 21 to 24 can optionally include that the transmitter is configured to provide a live stream of the computer program execution information and the keystroke information.

In example 26, the subject-matter of any one of examples 21 to 25 can optionally include that the transmitter is configured to provide a stored stream of the computer program execution information and the keystroke information.

In example 27, the subject-matter of any one of examples 21 to 26 can optionally include that the transmitter is configured to transmit to a keyboard of the at least one further computing device.

In example 28, the subject-matter of any one of examples 21 to 27 can optionally include that the transmitter is configured to transmit for indicating the input using backlights of a keyboard of the at least one further computing device.

In example 29, the subject-matter of any one of examples 21 to 28 can optionally include that the keystroke information is based on video of a keyboard of the first computer.

In example 30, the subject-matter of any one of examples 21 to 29 can optionally include that the keystroke information is based on mechanical switches of a keyboard of the first computer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An information distribution method comprising:
  receiving computer program execution information related to an execution of a computer program from a first computing device, which is executing the computer program;
  receiving keystroke information having a keystroke pattern related to a first user input to the computer program from the first computing device;
  transmitting the computer program execution information and the keystroke information to at least one further computing device; and
  executing a display of the keystroke information using backlights of a keyboard of the at least one further computing device to provide a keystroke light pattern as visual feedback to at least one second user.

2. The information distribution method of claim 1, wherein the keystroke information enables creation of macro keys and short cut keys on the at least one further computing device.

3. The information distribution method of claim 1, wherein the computer program execution information comprises video information of a computer game.

4. The information distribution method of claim 3, wherein the keystroke information comprises an input to the computer game provided by the first user on the first computing device for viewing by the at least one second user on the at least one further computing device.

5. The information distribution method of claim 1, wherein the transmitting comprises at least one of:
  providing a live stream of the computer program execution information and the keystroke information;
  providing a stored stream of the computer program execution information and the keystroke information.

6. The information distribution method of claim 1, wherein the keystroke information is based on at least one of video of a keyboard of the first computer, or mechanical switches of a keyboard of the first computer.

7. A computer readable medium comprising instructions which, when executed by a processor, cause the processor to perform an information distribution method, the information distribution method comprising:
  receiving computer program execution information related to an execution of a computer program from a first computing device, which is executing the computer program;
  receiving keystroke information having a keystroke pattern related to a first user input to the computer program from the first computing device;
  transmitting the computer program execution information and the keystroke information to at least one further computing device; and
  executing a display of the keystroke information using backlights of a keyboard of the at least one further computing device to provide a keystroke light pattern as visual feedback to at least one second user.

8. The computer readable medium of claim 7, wherein the keystroke information enables creation of macro keys and short cut keys on the at least one further computing device.

9. The computer readable medium of claim 7, wherein the computer program execution information comprises video information of a computer game.

10. The computer readable medium of claim 9, wherein the keystroke information comprises an input to the computer game provided by the first user on the first computing device for viewing by the at least one second user on the at least one further computing device.

11. The computer readable medium of claim 7, wherein the transmitting comprises at least one of:
  providing a live stream of the computer program execution information and the keystroke information,
  providing a stored stream of the computer program execution information and the keystroke information.

12. The computer readable medium of claim 7, wherein the keystroke information is based on at least one of video of a keyboard of the first computer, or mechanical switches of a keyboard of the first computer.

13. An information distribution server comprising:
  a receiver configured to receive computer program execution information related to an execution of a computer program from a first computing device, which is executing the computer program, and configured to receive keystroke information having a keystroke pattern related to a first user input to the computer program from the first computing device; and a transmitter configured to transmit the computer program execution information and the keystroke information to at least one further computing device; wherein the keystroke information is displayed using backlights of a keyboard of the at least one further computing device to provide a keystroke light pattern as visual feedback to at least one second user.

14. The information distribution server of claim 13, wherein the keystroke information enables creation of macro keys and short cut keys the at least one further computing device.

15. The information distribution server of claim 14, wherein the transmitter is configured to transmit to individually control the light source of each key.

16. The information distribution server of claim 13, wherein the computer program execution information comprises video information of a computer game.

17. The information distribution server of claim 16, wherein the keystroke information comprises an input to the computer game provided by the first user on the first computing device for viewing by the at least one second user on the at least one further computing device.

18. The information distribution server of claim 13, wherein the transmitter is configured to provide at least one of:

a live stream of the computer program execution information and the keystroke information, or a stored stream of the computer program execution information and the keystroke information, and enables the slow-motion and fast-forwarding control of each key from the stored stream.

19. The information distribution server of claim 13, wherein the keystroke information is based on at least one of video of a keyboard of the first computer, or mechanical switches of a keyboard of the first computer.

* * * * *